United States Patent
Adachi (10) Patent No.: US 10,882,472 B2
(45) Date of Patent: Jan. 5, 2021

(54) STRING-SHAPED-OBJECT BINDER

(71) Applicant: TOYOTA JIDOSHA KABUSHIKI KAISHA, Toyota (JP)

(72) Inventor: Satoshi Adachi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/285,954

(22) Filed: Feb. 26, 2019

(65) Prior Publication Data
US 2019/0275964 A1 Sep. 12, 2019

(30) Foreign Application Priority Data
Mar. 6, 2018 (JP) .................. 2018-039311

(51) Int. Cl.
| | | |
|---|---|---|
| F16B 1/00 | (2006.01) | |
| B60R 16/02 | (2006.01) | |
| F16L 3/02 | (2006.01) | |
| F16L 3/22 | (2006.01) | |
| F16L 3/12 | (2006.01) | |
| F16L 3/223 | (2006.01) | |
| F16L 3/237 | (2006.01) | |
| F16L 3/13 | (2006.01) | |
| B60G 15/00 | (2006.01) | |
| B60K 7/00 | (2006.01) | |
| H02G 3/32 | (2006.01) | |

(52) U.S. Cl.
CPC ............ *B60R 16/0215* (2013.01); *F16L 3/02* (2013.01); *F16L 3/1218* (2013.01); *F16L 3/13* (2013.01); *F16L 3/22* (2013.01); *F16L 3/223* (2013.01); *F16L 3/237* (2013.01); *B60G 15/00* (2013.01); *B60K 2007/0038* (2013.01); *H02G 3/32* (2013.01)

(58) Field of Classification Search
CPC ....... F16B 7/0493; F16L 3/02; A47B 96/1425
See application file for complete search history.

(56) References Cited

U.S. PATENT DOCUMENTS

| | | | | |
|---|---|---|---|---|
| 2,248,170 A | * | 7/1941 | Hansen Robert G | ..... B60R 9/02 224/570 |
| 2,686,029 A | * | 8/1954 | Raymond Charles F | ................... E04H 12/32 248/539 |
| 3,521,332 A | | 7/1970 | Kramer | |
| 5,703,330 A | | 12/1997 | Kujawski | |

(Continued)

FOREIGN PATENT DOCUMENTS

| | | |
|---|---|---|
| CN | 203718165 U | 7/2014 |
| JP | 2007-276738 A | 10/2007 |

(Continued)

*Primary Examiner* — Amy J. Sterling
(74) *Attorney, Agent, or Firm* — Sughrue Mion, PLLC (57) ABSTRACT

A string-shaped-object binder that binds together a plurality of string-shaped objects, each routed in a slackened state between two vehicle components that move relative to each other, at a predetermined position between the two vehicle components. The string-shaped-object binder includes a fixing retainer that fixedly retains one of the string-shaped objects, and a movement-allowing retainer that retains another one of the string-shaped objects so as to allow the string-shaped object to move in a direction in which an axis of the string-shaped object extends and in directions orthogonal to the axis.

14 Claims, 8 Drawing Sheets

(56) References Cited

U.S. PATENT DOCUMENTS

| | | | |
|---|---|---|---|
| D660,690 S * | 5/2012 | Mixides; Anthony | D8/396 |
| D791,558 S * | 7/2017 | Carpio; Josep Torres | D8/1 |
| 9,951,888 B2 * | 4/2018 | Boriack | F16L 3/223 |
| 2007/0234559 A1 | 10/2007 | Tokuda et al. | |
| 2009/0272576 A1 | 11/2009 | Medina | |
| 2012/0216375 A1 * | 8/2012 | Druhl | A01D 34/82 24/456 |

FOREIGN PATENT DOCUMENTS

| | | |
|---|---|---|
| JP | 2014-225996 A | 12/2014 |
| JP | 2015-201982 A | 11/2015 |
| KR | 201998052089 U | 10/1998 |
| WO | 2011146060 A1 | 11/2011 |

\* cited by examiner

STRING-SHAPED-OBJECT BINDER

INCORPORATION BY REFERENCE

The disclosure of Japanese Patent Application No. 2018-039311 filed on Mar. 6, 2018 including the specification, drawings and abstract is incorporated herein by reference in its entirety.

BACKGROUND

1. Technical Field

The present disclosure relates to a string-shaped-object binder used to bind together string-shaped objects, such as cables and hoses.

2. Description of Related Art

It is often the case in a vehicle that two components that move relative to each other are connected to each other by a flexible string-shaped object, such as a cable, hose, tube, or wire, for example, to supply electricity or a fluid or to transmit signals. This requires attention to be paid such that the string-shaped object can appropriately deform or move according to the relative movement of the components. Especially great attention is required when there is a plurality of string-shaped objects installed. Japanese Patent Application Publication No. 2007-276738 (JP 2007-276738 A) discloses a technique in which three cables, as a plurality of string-shaped objects that connects to each other a vehicle body and an in-wheel motor that are two components, are supported on the vehicle body by a retainer at a position between the vehicle body and the in-wheel motor.

SUMMARY

In the technique described in JP 2007-276738 A, the retainer functions as a binder that binds together the three cables that are a plurality of string-shaped objects, and has such a structure as to allow each cable to only rotate around an axis of the cable. Depending on conditions including the relative movement of the two components, the installation positions of the string-shaped objects, and the form of installation, using a binder having such a structure cannot be confidently said to allow the string-shaped objects to always appropriately deform or move according to the relative movement of the two components. Thus, there is considerable room left for improvement in terms of enhancing the usefulness of a binder used to bind together a plurality of string-shaped objects (which may be hereinafter referred to as a "string-shaped-object binder"). The present disclosure provides a useful string-shaped-object binder.

An aspect of the present disclosure provides a string-shaped-object binder that binds together a plurality of string-shaped objects, each routed in a slackened state between two vehicle components that move relative to each other, at a predetermined position between the two vehicle components. The string-shaped-object binder includes a fixing retainer and a movement-allowing retainer. The fixing retainer fixedly retains one of the string-shaped objects. The movement-allowing retainer retains another one of the string-shaped objects so as to allow the string-shaped object to move in a direction in which an axis of the string-shaped object extends and in directions orthogonal to the axis.

This string-shaped-object binder holds together the string-shaped objects and thereby keeps the string-shaped objects from moving separately even when the two components move relative to each other. Moreover, an excessive force acting between the string-shaped object retained by the fixing retainer and the string-shaped object retained by the movement-allowing retainer is prevented or reduced by the presence of the movement-allowing retainer.

This aspect is a basic aspect relating to the string-shaped-object binder (which may be hereinafter referred to simply as a "binder"). The binder in this aspect has a function of binding together a plurality of string-shaped objects, or in other words, a function of holding together a plurality of string-shaped objects into one bundle, between two vehicle components (which may be hereinafter referred to simply as "components"). The binder in this aspect holds together the string-shaped objects that are installed in a slackened (sagging) state, and thereby organizes the installation space of these string-shaped objects. Moreover, this binder keeps the string-shaped objects from moving separately as the components move relative to each other, and thus can effectively prevent interference with the two components or other components. On the other hand, the movement-allowing retainer allows the string-shaped object to move as described above when the two components move relative to each other, so that an excessive force acting between the string-shaped object retained by the fixing retainer and the string-shaped object retained by the movement-allowing retainer is prevented or reduced. In other words, an excessive tension acting on each string-shaped object is prevented or reduced.

The two vehicle components in this aspect are not particularly limited and may be any components that move relative to each other. For example, a vehicle body and a carrier (wheel retaining member) that moves up and down relative to the vehicle body through a suspension device, or a vehicle body and a component mounted on the carrier, correspond to the two vehicle components. Further, other various components, for example, a vehicle body and a door, a vehicle body and a seat, and a vehicle body and a steering shaft, also correspond to the two vehicle components.

The string-shaped object in this aspect is a flexible object. Various types of objects, for example, a cable that supplies electricity, a hose (tube) that supplies a fluid, such as working oil, and a wire (electric wire) that transmits and receives control signals, correspond to the string-shaped object. The binder in this aspect may be a binder that binds together the same type of string-shaped objects, or a binder that binds together different types of string-shaped objects.

The binder in this aspect should include at least one fixing retainer and at least one movement-allowing retainer. More particularly, when the binder in this aspect is a binder that binds together three or more string-shaped objects as a plurality of string-shaped objects, the binder may include a plurality of fixing retainers or include a plurality of movement-allowing retainers. From the viewpoint of minimizing the tension that acts on each of the string-shaped objects as the two components move relative to each other, it is desirable that the binder in this aspect be configured such that the fixing retainer retains one of the string-shaped objects while the two or more movement-allowing retainers respectively retain the other two or more string-shaped objects.

The fixing retainer and the movement-allowing retainer of the binder in this aspect may be unable to move relative to each other or be able to move relative to each other. In view of the simplicity of the structure of the binder, it is desirable that the fixing retainer and the movement-allowing retainer be made unable to move relative to each other, for example, by being integrated.

The binder in this aspect may be configured such that the fixing retainer and the movement-allowing retainer retain the string-shaped objects by directly coming into contact with the string-shaped objects, or retain the string-shaped objects through a cushioning material, such as rubber or resin. The material of the binder in this aspect is not limited, and various binders, such as a metal binder, a resin binder, and a binder combining a metal part and a resin part, are conceivable. The manufacturing method is not particularly limited, either, and various methods can be used to manufacture the binder according to the material; for example, a metal binder can be manufactured by press-forming etc., and a resin binder can be manufactured by injection molding etc.

In the above string-shaped-object binder, the movement-allowing retainer may retain the other one of the string-shaped objects so as to allow the string-shaped object to move in the directions orthogonal to the axis within a set allowable range.

The movement-allowing retainer retains the string-shaped object while allowing this string-shaped object to move in the direction in which the axis of the string-shaped object extends (which may be hereinafter referred to as an "axial direction") and in the directions orthogonal to the axis (which may be hereinafter referred to as "axis-orthogonal directions"). If the range in which the string-shaped object is allowed to move in the axis-orthogonal directions is too narrow, a large tension may act on the string-shaped object. Conversely, if this range is too wide, the effect of holding together the string-shaped objects will be reduced. With this in mind, the range in which the movement-allowing retainer of the string-shaped-object binder allows the string-shaped object to move in the axis-orthogonal directions can be set to an appropriate range. Specifically, it is desirable that the set allowable range be, for example, 15% or more to 30% or less of the diameter, i.e., the external dimension in the axis-orthogonal direction, of the string-shaped object to be retained.

In the above string-shaped-object binder, the movement-allowing retainer may retain the other one of the string-shaped objects so as to allow the string-shaped object to rotate around the axis.

This configuration can more effectively prevent or reduce an excessive tension acting on each string-shaped object.

In the above string-shaped-object binder, an inner circumference of each of the fixing retainer and the movement-allowing retainer may have a shape of a cylinder in which the string-shaped object is retained.

Having a shape of a cylinder in the cylindrical fixing retainer and movement-allowing retainer (which may be hereinafter collectively referred to simply as "retaining parts"), the binder of this configuration can easily and reliably retain the string-shaped objects. The length, i.e., the dimension in the axial direction, of the cylinder is not particularly limited. However, if the length is too small, the strength of the binder itself as well as the force with which the binder retains the string-shaped objects will be reduced. Conversely, if the length is too large, a high tension may act on the string-shaped object. Therefore, it is desirable that the length of the cylinder be specifically, for example, 1.5 times or more to 4 times or less of the diameter of the string-shaped object to be retained.

In the string-shaped-object binder, the fixing retainer may not have a clearance between the inner circumference of the fixing retainer and the outer circumference of the string-shaped object retained by the fixing retainer, while the movement-allowing retainer may have a clearance between the inner circumference of the movement-allowing retainer and the outer circumference of the string-shaped object retained by the movement-allowing retainer.

More particularly, in this configuration, a retainer for which the clearance is not provided can be used as the fixing retainer, and a retainer for which an appropriate amount of clearance is provided can be used as the movement-allowing retainer. Specifically, when the string-shaped objects have the same outside diameters, the inside diameter of the cylindrical part forming the fixing retainer and the inside diameter of the cylindrical part forming the movement-allowing retainer can be differentiated. According to this aspect, a binder having a simple structure is realized. Alternatively, the clearance may be set to be smaller than zero, so that elastic deformation of at least one of the cylindrical part forming the fixing retainer and the string-shaped object to be retained can be used to firmly retain the string-shaped object by the fixing retainer. To put it simply, a fixing retainer having a shape like a cylindrical part swaged onto the string-shaped object is realized.

In the above string-shaped-object binder, each of the fixing retainer and the movement-allowing retainer may have an opening extending along the entire length of the retainer in the direction of the axis, at a predetermined position in a circumferential direction of the retainer. A width of the opening may be smaller than a diameter of the string-shaped objects.

According to the above-mentioned configuration, the fixing retainer and the movement-allowing retainer retains the string-shaped objects that are respectively received into the fixing retainer and the movement-allowing retainer as the fixing retainer and the movement-allowing retainer are elastically deformed such that the opening is pushed wide open. Thus, this configuration can facilitate the work of binding together a plurality of string-shaped objects by the binder, or in other words, the work of fitting the binder onto a plurality of string-shaped objects.

The above string-shaped-object binder may be supported by neither of the two vehicle components.

This configuration gives the binder some freedom to move relative to the two components, and can thereby prevent or reduce the tension acting on each of the string-shaped objects, more particularly, on the string-shaped object retained by the fixing retainer, when the string-shaped objects move as the two components move relative to each other. Moreover, since the binder need not be supported by either of the two components, the work of binding together a plurality of string-shaped objects by the binder can be performed easily.

In the above string-shaped-object binder, the string-shaped objects may be routed between the two vehicle components so as to be arranged alongside one another in a state of each being slackened in a U-shape. The string-shaped-object binder may bind together the string-shaped objects at a position where bottom portions of the U-shapes of the respective string-shaped objects are located.

When the string-shaped objects are slackened in a U-shape, the bottom portion of the U-shape of each string-shaped object is a portion forming the vertex of the slack, and generally is a portion that is moved most when the two components move relative to each other. Thus, the bottom portions are portions at which the string-shaped objects are likely to move separately. In the above configuration, the binder is located so as to bind together these portions, so that the string-shaped objects can be effectively held together. "The bottom of a U-shape" means a portion of the curve protruding farthest outward, and can be generally considered as a central portion of the curve. Depending on the orientation of the U-shape, the bottom portion can also be regarded as the vertex of the U-shape, a protruding end of the U-shape, etc. In a case where the bottom portion of the U-shape transitions as the two components move relative to each other, for example, the binder in this aspect can bind together portions that form the bottoms of the U-shapes when the two components are located at standard relative positions.

In the above string-shaped-object binder, the two vehicle components may be a vehicle body and a component that is mounted on a carrier that retains a wheel by being moved up and down relative to the vehicle body through a suspension device. The string-shaped-object binder may bind together the string-shaped objects routed between the vehicle body and the component.

When the vehicle is running, the carrier moves up and down relative to the vehicle body relatively frequently and violently. Since the string-shaped objects are moved relatively frequently and violently according to this up-and-down movement, this aspect is an aspect in which one can sufficiently enjoy the advantage of binding together the string-shaped objects by the binder. This advantage can be more sufficiently enjoyed when the wheel is a steered wheel, as the carrier also turns around an axis of a kingpin in that case. The component mounted on the carrier in this aspect is not particularly limited. The binder in this aspect can be used for the purpose of binding together string-shaped objects that are connected to various components, for example, a driving motor to be described later, a shock absorber, or various types of sensors including a wheel speed sensor.

In the above string-shaped-object binder, the component mounted on the carrier may be a driving motor. The string-shaped objects may be three cables that supply electricity to the driving motor. The string-shaped-object binder may include the fixing retainer that fixedly retains one of the three cables, and the two movement-allowing retainers that respectively retain the other two of the three cables.

In the above configuration, the driving motor may be a motor that is regarded as a so-called in-wheel motor. For example, in a case where the driving motor is a three-phase motor, the three cables may be cables that respectively supply electricity to the three phases. According to this aspect, one can sufficiently enjoy the above advantage by binding together such cables by the binder.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4AA is a view schematically showing a string-shaped-object binder of a modified example;

FIG. 4AB is a view schematically showing a string-shaped-object binder of a modified example;

FIG. 4AC is a view schematically showing a string-shaped-object binder of a modified example;

FIG. 4AD is a view schematically showing a string-shaped-object binder of a modified example;

FIG. 4AE is a view schematically showing a string-shaped-object binder of a modified example;

FIG. 4AF is a view schematically showing a string-shaped-object binder of a modified example;

DETAILED DESCRIPTION OF EMBODIMENTS

As modes for carrying out the patentable disclosure, a string-shaped-object binder that is an embodiment of the patentable disclosure and modified examples of this string-shaped-object binder will be described below in detail with reference to the drawings. The patentable disclosure can be carried out not only in the mode of the embodiment but also in various other modes with various changes and improvements made thereto based on the knowledge of those skilled in the art.

String-Shaped-Object Binder of Embodiment in Use

Figure 1:
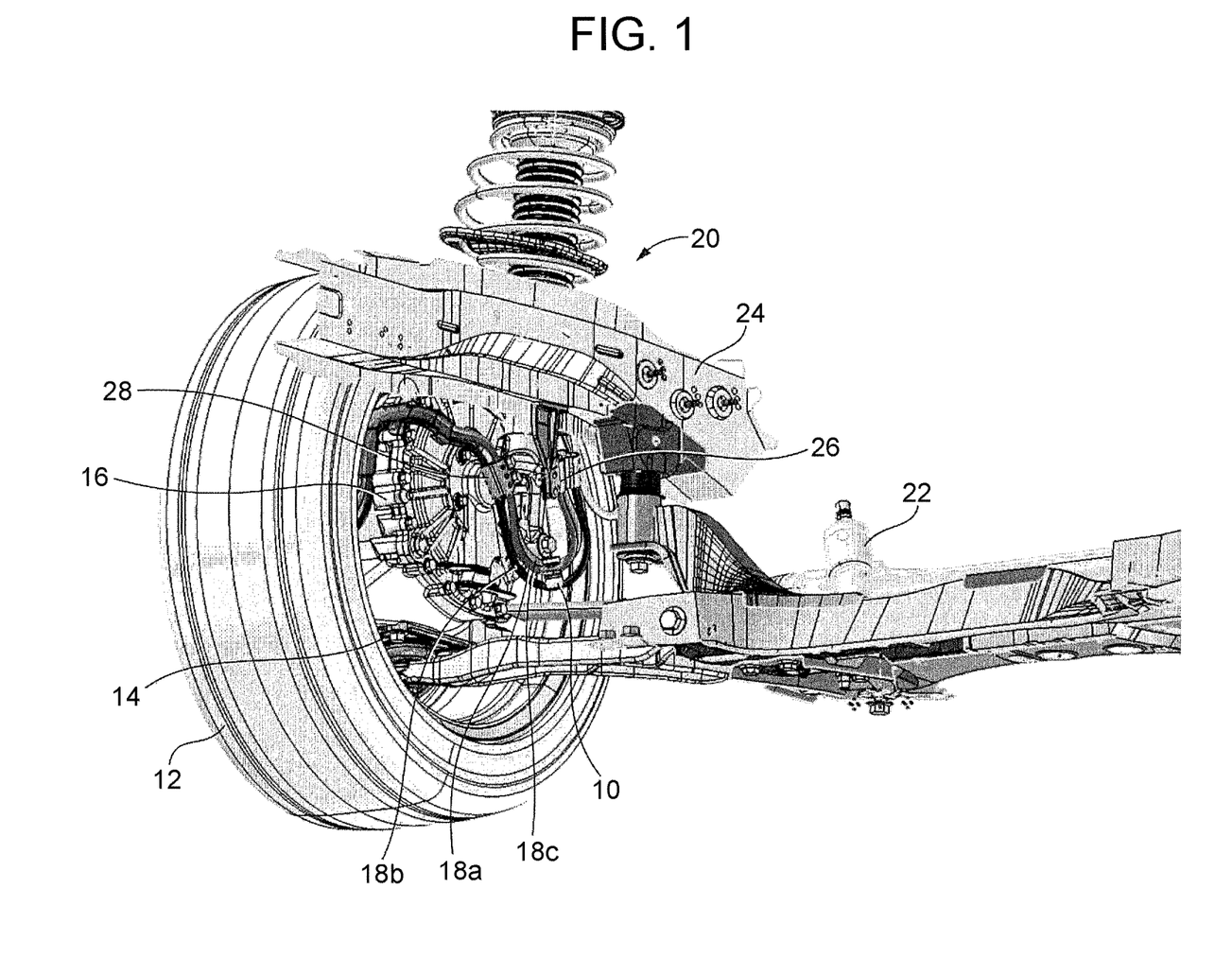
FIG. 1 is a perspective view showing a cable clamp in use that is a string-shaped-object binder of an embodiment.

As shown in FIG. 1, a Cable Clamp 10 that is the String-Shaped-Object binder of the embodiment is used in a vehicle to bind together three cables 18a, 18b, 18c (which may be hereinafter collectively referred to as "cables 18" when no distinctions are needed among the three cables) that supply electricity from a vehicle body side to a driving motor 16 (which is a three-phase electric motor) fixedly mounted on a carrier 14 that rotatably retains one wheel 12. The three cables 18 have the same outside diameter, and the cables 18 are string-shaped objects that are installed so as to be arranged alongside one another.

The carrier 14 can move up and down relative to the vehicle body through a MacPherson suspension device 20. Since the wheel 12 is a steered wheel, the carrier 14 functions as a steering knuckle and can be turned around an axis of a kingpin by a steering device 22.

The three cables 18 are fixed at one position by a bracket 26 that is fixedly attached to a side member 24 that forms a part of the vehicle body, and are fixed at another position by another bracket 28 that is fixedly attached to the driving motor 16. The cables 18 are routed between the side member 24 and the driving motor 16 so as to be arranged alongside one another in a state of each being slackened in a U-shape between the positions at which the cables 18 are fixed by the brackets 26, 28, respectively. To put it simply, the three cables 18 that are each a string-shaped object are each routed in a slackened state between the vehicle body and the driving motor 16 that are two vehicle components that move relative to each other.

FIG. 1 shows a state where the wheel 12 is neither bounding or rebounding relative to the vehicle body nor steered, i.e., a state where the driving motor 16 and the vehicle body are located at standard relative positions. In this state, the cable clamp 10 binds together the three cables 18 at a predetermined position, i.e., a position where bottoms of the respective three cables 18 slackened in a U-shape are located, between the positions at which the cables 18 are fixed by the brackets 26, 28, respectively.

In other words, the cable clamp 10 holds together the three cables 18 into one bundle at this position.

The cable clamp 10 is supported neither by the driving motor 16 nor by any part of the vehicle body, and is hung in the air as if clinging to the three cables 18.

Structure of String-Shaped-Object Binder of Embodiment

Figure 2A:
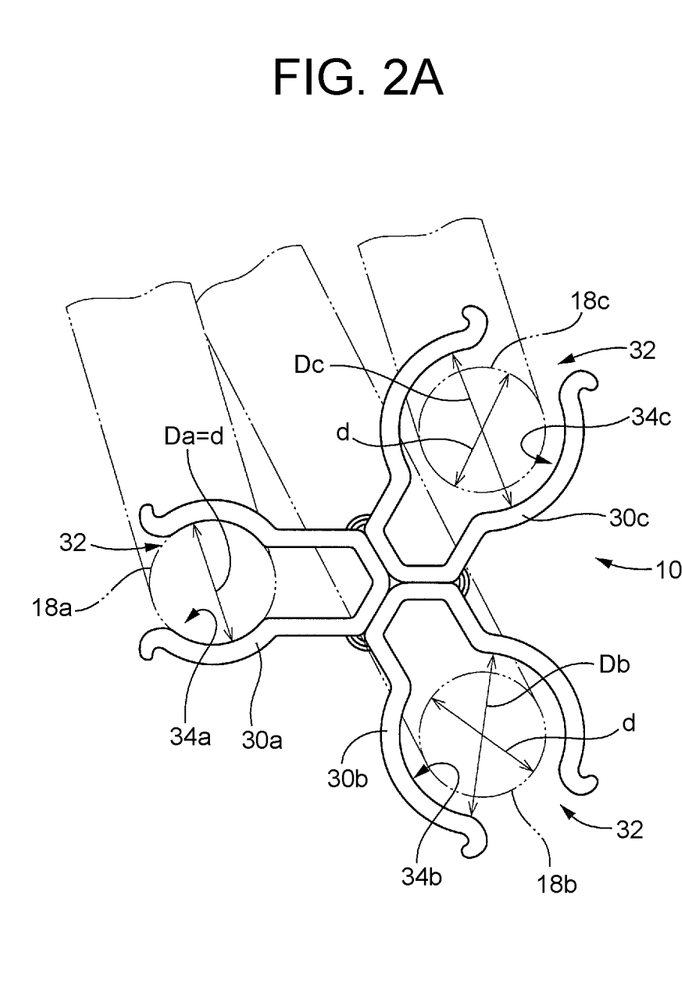
FIG. 2A is an enlarged view of the cable clamp of FIG. 1, as seen from a direction of axes of the cables.
Figure 2B:
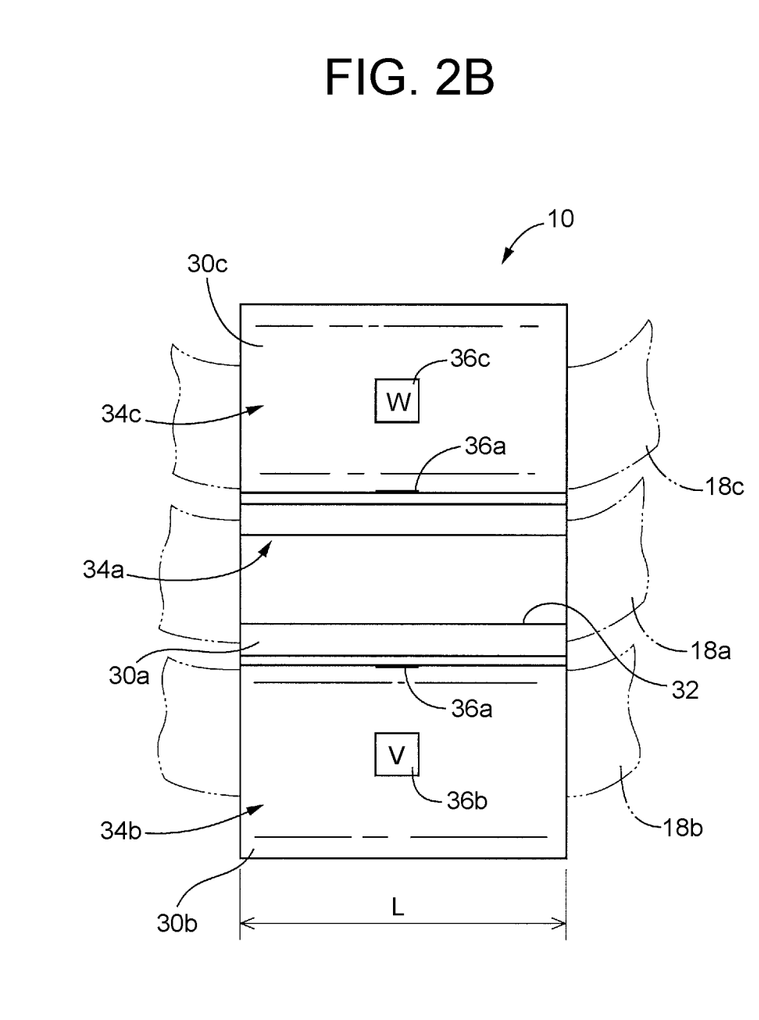
FIG. 2B is an enlarged view of the cable clamp of FIG. 1, as seen from a direction orthogonal to the axes of the cables.

The cable clamp 10 that is the string-shaped-object binder of the embodiment has the structure as shown in FIG. 2A and FIG. 2B. FIG. 2A is a view of the cable clamp 10 as seen from a direction in which axes of the cables 18 extend (an axial direction), and FIG. 2B is a view of the cable clamp 10 as seen from a direction orthogonal to the axes of the cables 18 (axis-orthogonal direction).

The cable clamp 10 is made of steel and, as can be seen from FIG. 2A and FIG. 2B, composed of three pieces 30a, 30b, 30c (which may be collectively referred to as "pieces 30" when no distinctions are needed among the three pieces). The pieces 30 are obtained by press-forming band-shaped steel materials, and these pieces are joined together by welding to form the cable clamp 10. Each piece 30 has a shape of a cylinder with an opening 32 extending along the entire length of the cylinder in the axial direction, at a predetermined position in a circumferential direction of the cylinder. The pieces 30 have parts that face one another and each form one cylinder, and these parts function as retaining parts 34 that retain the cables 18. More particularly, a retaining part 34a, a retaining part 34b, and a retaining part 34c retain the cable 18a, the cable 18b, and the cable 18c, respectively. The retaining part 34 is a collective term for the retaining parts 34a, 34b, 34c, and these retaining parts may be referred to as the retaining parts 34 when no distinctions are needed among the three retaining parts.

An inside diameter Da of the retaining part 34a is set so as to be equal to an outside diameter d of the cable 18a in a state where the retaining part 34a retains the cable 18a. Thus, there is no clearance between an outer circumference of the cable 18a and an inner circumference of the retaining part 34a. More particularly, in this state, the retaining part 34a is elastically deformed (in a state where the retaining part 34a is not elastically deformed, the clearance is smaller than zero), and fastens the cable 18a by an elastic reaction force. Thus fastened, the cable 18a is prohibited from moving in the axial direction, moving in the axis-orthogonal directions, and moving by rotating around the axis, relative to the cable clamp 10. Thus, the retaining part 34a functions as a fixing retainer that fixedly retains one of the three cables 18. Hereinafter, the retaining part 34a may be referred to as the fixing retainer 34a.

On the other hand, inside diameters Db, Dc (Db=Dc) of the retaining part 34b and the retaining part 34c are set to be larger than the outside diameter d of the cables 18b, 18c. Thus, in a state where the retaining part 34b and the retaining part 34c respectively retain the cable 18b and the cable 18c, there is a set clearance between outer circumferences of the cables 18b, 18c and inner circumferences of the retainers 34b, 34c. Accordingly, the cables 18b, 18c are each allowed to move in the axial direction, move in the axis-orthogonal directions, and move by rotating around the axis, relative to the cable clamp 10. Thus, the retaining part 34b and the retaining part 34c each function as a movement-allowing retainer that retains another one of the three cables 18 so as to allow the cable 18 to move as described above. Hereinafter, the retaining parts 34b, 34c may be referred to as the movement-allowing retainers 34b, 34c.

A range in which the cables 18b, 18c are allowed to move in the axis-orthogonal directions by the movement-allowing retainers 34b, 34c is set to an appropriate value. Specifically, the set allowable range in the cable clamp 10 is set as the clearance to about 15% of the outside diameter d of the cables 18b, 18c that is the external dimension thereof in the axis-orthogonal direction. In the cable clamp 10, the dimension in the axial direction, i.e., a length L, of each retaining part 34 is about 2.5 times the outside diameter d of the cable 18.

To fit the cable clamp 10 onto the three cables 18 routed between the brackets 26, 28, one can insert the cables 18 respectively into the retaining parts 34 by elastically deforming the retaining parts 34 such that the opening 32 formed in each piece 30 of the cable clamp 10 is pushed wide open. Thus, the cable clamp 10 can be easily mounted.

The three cables 18a, 18b, 18c correspond to the three phases, i.e., the U-phase, the V-phase, and the W-phase, of the driving motor 16, and it is specified which of the three cables 18 should be retained by which of the three retaining parts 34. In other words, one-to-one correspondence between the retaining parts 34 and the cables 18 is specified. It is possible that a worker may make a mistake about this correspondence when fitting the cable clamp 10. With such a mistake taken into account, different colors of surface coating materials are applied to the three cables 18, and a mark 36 is attached to each retaining part 34, i.e., each piece 30. Specifically, a U-mark 36a is attached to the piece 30a having the fixing retainer 34a, a V-mark 36b is attached to the piece 30b having the movement-allowing retainer 34b, and a W-mark 36c is attached to the piece 30c having the movement-allowing retainer 34c. In other words, each retaining part 34 is provided with the mark 36 (which is a collective term for the mark 36a, the mark 36b, and the mark 36c) to specify the cable 18 that is the string-shaped object to be retained by that retaining part 34. In FIG. 2B, a surface of the mark 36a is hardly visible.

Workings of String-Shaped-Object Binder of Embodiment

Figure 3A:
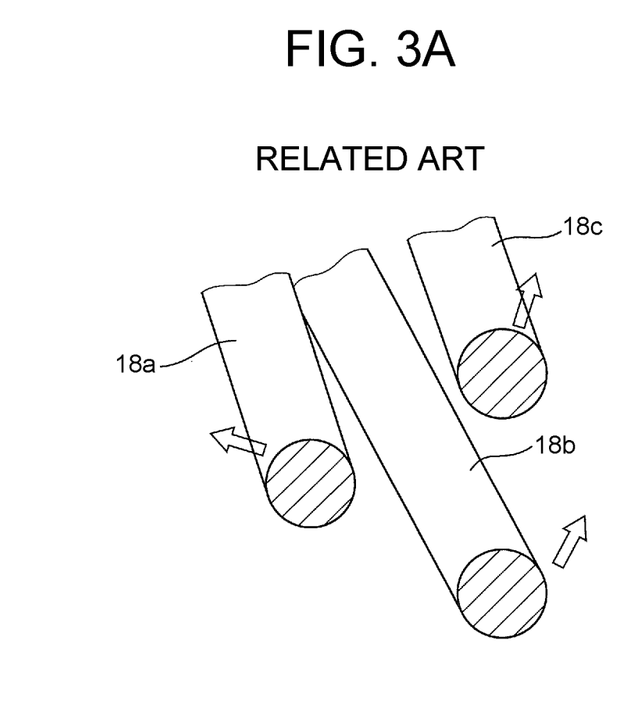
FIG. 3A is a view illustrating the movement of cables that are string-shaped objects and a tension acting on the cables in a case where the cable clamp is not used.

If the cable clamp 10 that is the string-shaped-object binder of the embodiment is not provided, when the wheel 12 moves up and down relative to the vehicle body or the wheel 12 is steered, i.e., when the driving motor 16 and the side member 24 of the vehicle body move relative to each other, the slacked three cables 18 will move according to this relative movement. For example, the three cables 18 move separately from one another as shown in FIG. 3A that shows the cables 18 from the same viewpoint as FIG. 2A. Such a movement may result in interference with a component of the vehicle installed in the vicinity. However, with the cable clamp 10 fitted, the three cables 18 are held together into one bundle and kept from moving separately as can be seen from FIG. 2A. In particular, the bottom portions of the U-shapes in which the cables 18 are slackened tend to move considerably. Therefore, installing the cable clamp 10 at such a position as to bind together these portions can effectively keep the three cables 18 from moving separately.

Figure 3B:
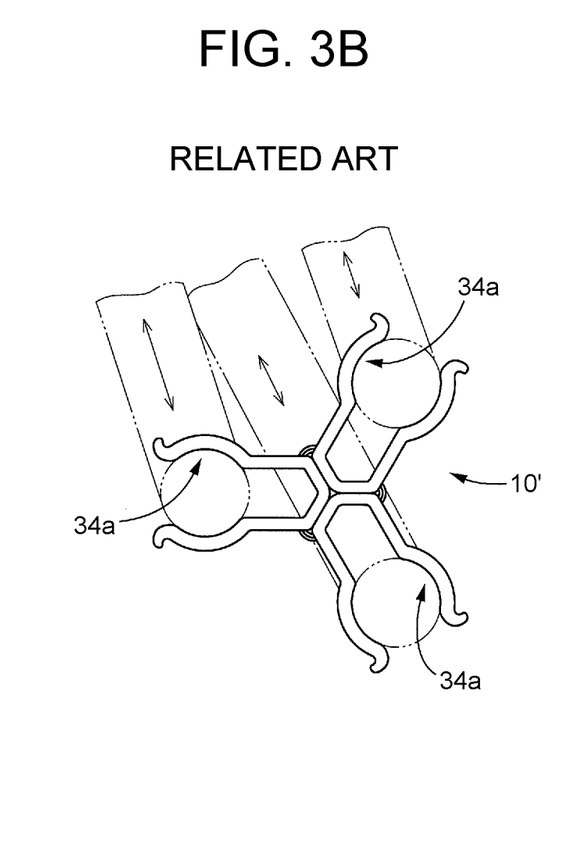
FIG. 3B is a view illustrating the movement of cables that are string-shaped objects and a tension acting on the cables in a case where a cable clamp of a comparative example is used.

A case will be considered where a cable clamp 10' of a comparative example as shown in FIG. 3B is fitted in place of the cable clamp 10. The cable clamp 10' does not have the movement-allowing retainers 34b, 34c, and all the three retaining parts 34 are the fixing retainers 34a. While such a cable clamp 10' can firmly hold together the three cables 18, the three cables 18 are fixed to one another, so that, as the driving motor 16 and the side member 24 of the vehicle body move relative to each other, an excessive force, such as a tension, acts on one of the three cables 18 between the bracket 26 or the bracket 28 and the cable clamp 10' as shown in FIG. 3B. This excessive force hinders the relative movement and can cause damage to the cables 18.

By contrast, when the cable clamp 10 is used, as shown in FIG. 2A, the cables 18 retained by the respective movement-allowing retainers 34b, 34c are each allowed to move in the axial direction, move in the axis-orthogonal directions, and move by rotating around the axis, so that an excessive force acting on each cable 18 is prevented or reduced. Since the movement in the axis-orthogonal directions is allowed only within the above-described set allowable range, the three cables 18 move appropriately.

Modified Examples

Figure 4:
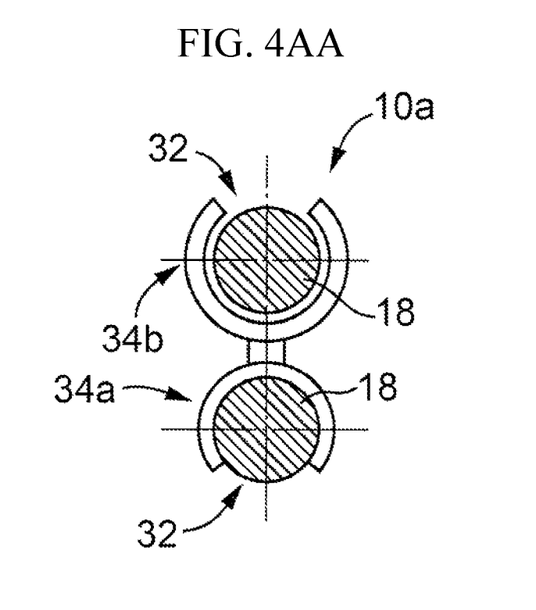
Figure 4B:
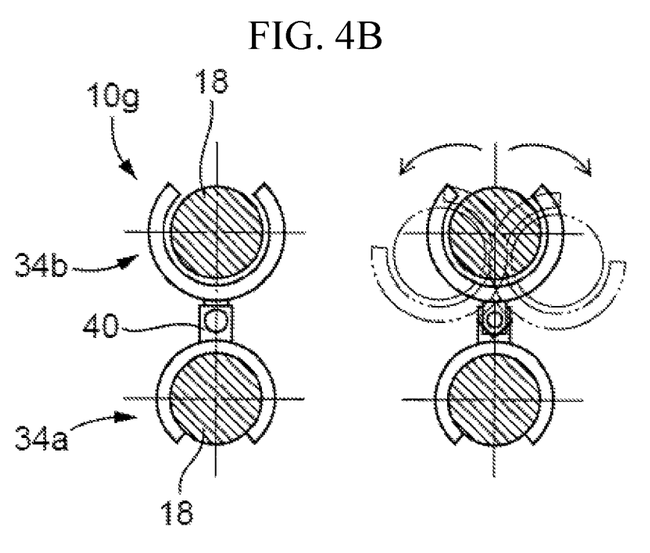
FIG. 4B is a view schematically showing a string-shaped-object binder of another modified example.
Figure 4C:
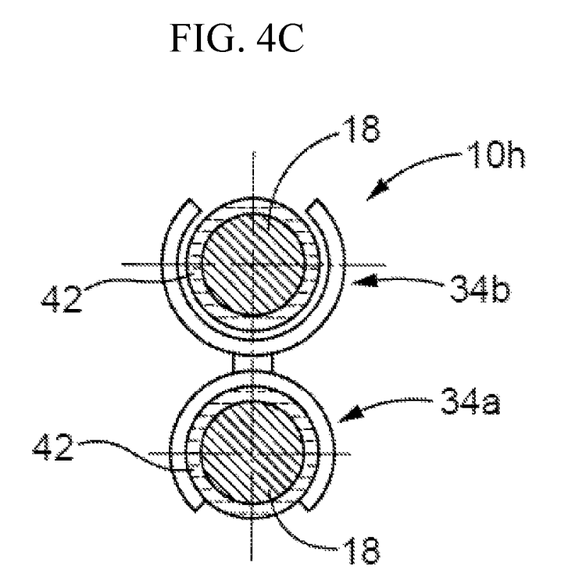
FIG. 4C is a view schematically showing a string-shaped-object binder of yet another modified example.

In the following, various modified examples of the string-shaped-object binder of the above embodiment will be briefly described with reference to FIGS. 4AA-4AF, FIG. 4B, and FIG. 4C that are schematic drawings. To simplify the description, each of the string-shaped-object binders of the modified examples is represented as a binder that binds together two string-shaped objects. Each of the string-shaped-object binders shown in FIGS. 4AA-4AF, FIG. 4B, and FIG. 4C is a resin binder formed by injection molding, and both the fixing retainer and the movement-allowing retainer of each binder have a cylindrical shape. In FIGS. 4AA-4AF, FIG. 4B, and FIG. 4C, the fixing retainer and the movement-allowing retainer are denoted by reference signs 34a, 34b as in the cable clamp 10 that is the string-shaped-object binder of the embodiment. Further, in FIGS. 4AA-4AF, FIG. 4B, and FIG. 4C, the string-shaped objects are denoted by reference sign 18 that has been used in the description of the cable clamp 10 that is the string-shaped-object binder of the embodiment, and only cross-sections of these string-shaped objects are shown.

Of the several string-shaped-object binders shown in FIGS. 4AA-4AF, a string-shaped-object binder 10a is a binder of a basic aspect that binds together two string-shaped objects 18 by one fixing retainer 34a and one movement-allowing retainer 34b. The fixing retainer 34a and the movement-allowing retainer 34b have the openings 32 on the opposite sides from each other, and the string-shaped objects 18 are received from the opposite sides from each other. A string-shaped-object binder 10b has an S-shaped cross-section, and the two curved portions of the S-shape respectively function as the fixing retainer 34a and the movement-allowing retainer 34b. The openings 32 are formed at ends of the curved portions, and the string-shaped objects 18 are respectively received through the openings 32.

A string-shaped-object binder 10c has a loop shape, with a portion on one side cut out as seen in cross-section. This cutout portion forms the opening 32, and the fixing retainer 34a and the movement-allowing retainer 34b are provided one on each side of the opening 32. The string-shaped objects 18 are respectively received into the fixing retainer 34a and the movement-allowing retainer 34b through the one opening 32. A string-shaped-object binder 10d has a shape such that the fixing retainer 34a and the movement-allowing retainer 34b are coupled together at portions on the opposite side from their respective openings 32, so as to have the openings 32 arranged next to each other on the same side.

A string-shaped-object binder 10e is formed roughly in a gourd shape as seen in cross-section and thereby provided with the fixing retainer 34a and the movement-allowing retainer 34b. The string-shaped-object binder 10e has one opening 32 provided in the movement-allowing retainer 34b. The opening 32 is pushed wide open by using elastic deformation of the string-shaped-object binder 10e, and the string-shaped objects 18 are respectively received into the fixing retainer 34a and the movement-allowing retainer 34b in this order through the opening 32 thus pushed wide open. Like the string-shaped-object binder 10e, a string-shaped-object binder 10f is formed roughly in a gourd shape as seen in cross-section and thereby provided with the fixing retainer 34a and the movement-allowing retainer 34b. The movement-allowing retainer 34b has a slit, and an opening is formed by pushing this slit wide open. The string-shaped objects 18 are respectively received into the fixing retainer 34a and the movement-allowing retainer 34b in this order through the opening thus formed. A fastener 38 is provided at a position where the slit is formed. After the string-shaped objects 18 are received into the fixing retainer 34a and the movement-allowing retainer 34b, the fastener 38 prevents the slit from opening.

Each of the string-shaped-object binders 10a to 10f having been described so far has the fixing retainer 34a and the movement-allowing retainer 34b that are integrated. However, as shown in FIG. 4B, a string-shaped-object binder 10g of which the fixing retainer 34a and the movement-allowing retainer 34b can move relative to each other can also be adopted as a string-shaped-object binder of another modified example. Specifically, the fixing retainer 34a and the movement-allowing retainer 34b of the string-shaped-object binder 10g are coupled together by a hinge 40, so that the fixing retainer 34a and the movement-allowing retainer 34b can turn relative to each other. When the fixing retainer 34a and the movement-allowing retainer 34b can thus move relative to each other, an excessive force acting on the string-shaped object 18 can be more effectively prevented or reduced.

A string-shaped-object binder 10h as shown in FIG. 4C can also be adopted as a string-shaped-object binder of yet another modified example. In each of the fixing retainer 34a and the movement-allowing retainer 34b of the string-shaped-object binder 10h, the string-shaped object 18 is retained with a cylindrical cushioning material 42, such as rubber, interposed between the inner circumference of the fixing retainer 34a or the movement-allowing retainer 34b and the outer circumference of the string-shaped object 18. The string-shaped object 18 is sufficiently protected when such a cushioning material 42 is used.

Figure 5A:
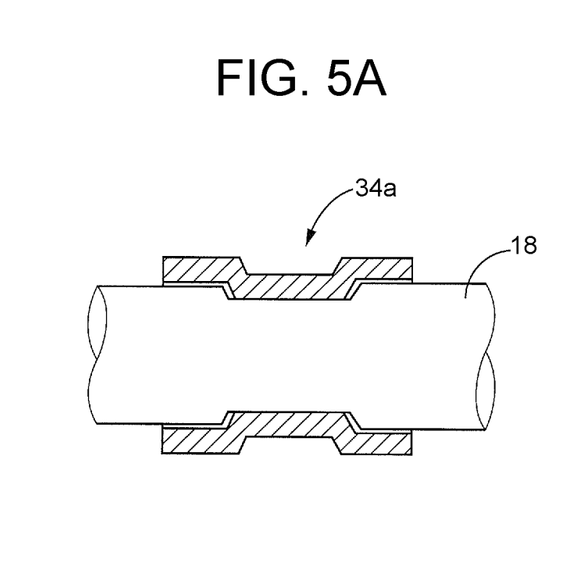
FIG. 5A is a view schematically showing a modified example relating to fixing of the string-shaped object to a fixing retainer of the string-shaped-object binder.
Figure 5B:
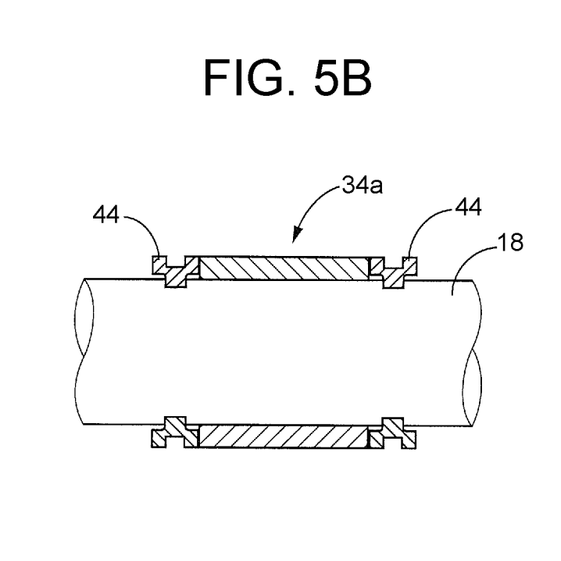
FIG. 5B is a view schematically showing another modified example relating to fixing of the string-shaped object to the fixing retainer of the string-shaped-object binder.

Regarding fixing of the string-shaped object by the fixing retainer, for example, the fixing retainer 34a may be made of metal and swaged onto the string-shaped object 18 as shown in FIG. 5A. As another modified example, for example, a metal ring 44 can be attached so as to be swaged onto the string-shaped object 18 on each side of the fixing retainer 34a in the axial direction as shown in FIG. 5B, to thereby restrict the movement of the fixing retainer 34a in the axial direction.

What is claimed is:

1. A string-shaped-object bind structure comprising:
   a plurality of string-shaped objects bound together by a string-shaped-object binder, each of the plurality of string-shaped objects routed in a slackened state between two vehicle components that are configured to move relative to each other, at a predetermined position between the two vehicle components;
   the string-shaped-object binder, the string-shaped-object binder comprising:
   a fixing retainer that fixedly retains one of the string-shaped objects; and a movement-allowing retainer that retains another one of the string-shaped objects so as to allow the string-shaped object to move in a direction in which an axis of the string-shaped object extends and in directions orthogonal to the axis, wherein an inner diameter of the fixing retainer is equal to an outer diameter of the one of the string-shaped objects.

2. The string-shaped-object bind structure according to claim 1, wherein the movement-allowing retainer retains the other one of the string-shaped objects so as to allow the string-shaped object to move in the directions orthogonal to the axis within a set allowable range.

3. The string-shaped-object bind structure according to claim 1, wherein the movement-allowing retainer retains the other one of the string-shaped objects so as to allow the string-shaped object to rotate around the axis.

4. The string-shaped-object bind structure according to claim 1, wherein an inner circumference of each of the fixing retainer and the movement-allowing retainer has a shape of a cylinder in which the string-shaped object is retained.

5. The string-shaped-object bind structure according to claim 4, wherein:

the fixing retainer does not have a clearance between the inner circumference of the fixing retainer and an outer circumference of the string-shaped object retained by the fixing retainer; and the movement-allowing retainer has a clearance between the inner circumference of the movement-allowing retainer and an outer circumference of the string-shaped object retained by the movement-allowing retainer.

6. The string-shaped-object bind structure according to claim 4, wherein:

each of the fixing retainer and the movement-allowing retainer has an opening extending along an entire length of the retainer in the direction of the axis, at a predetermined position in a circumferential direction of the retainer; and a width of the opening is smaller than a diameter of the string-shaped objects.

7. The string-shaped-object bind structure according to claim 1, wherein the string-shaped-object binder is supported by neither of the two vehicle components.

8. The string-shaped-object bind structure according to claim 1, wherein:

the string-shaped objects are routed between the two vehicle components so as to be arranged alongside one another in a state of each being slackened in a U-shape; and the string-shaped-object binder binds together the string-shaped objects at a position where bottom portions of the U-shapes of the respective string-shaped objects are located.

9. The string-shaped-object bind structure according to claim 1, wherein:

the two vehicle components are a vehicle body and a component that is mounted on a carrier that retains a wheel by being moved up and down relative to the vehicle body through a suspension device; and the string-shaped-object binder binds together the string-shaped objects routed between the vehicle body and the component.

10. The string-shaped-object bind structure according to claim 9, wherein:

the component mounted on the carrier is a driving motor;

the string-shaped objects are three cables that supply electricity to the driving motor; and the string-shaped-object binder includes the fixing retainer that fixedly retains one of the three cables, and two movement-allowing retainers, including the movement-allowing retainer, that respectively retain the other two of the three cables.

11. The string-shaped-object bind structure according to claim 1, wherein an outer diameter of each of the string-shaped objects is a same size.

12. The string-shaped-object bind structure according to claim 1, wherein a clearance is provided between an outer circumference of the one of the string-shaped objects and an inner circumference of the movement-allowing retainer in a state where the movement-allowing retainer retains the one of the string-shaped objects.

13. The string-shaped-object bind structure according to claim 1, wherein an inner diameter of the movement-allowing retainer is different from an outer diameter of the another one of the string-shaped objects.

14. The string-shaped-object bind structure according to claim 13, wherein the outer diameter of the one of the string-shaped objects is a same size as the outer diameter of the another one of the string-shaped objects.

* * * * *